July 10, 1951 — L. SPRARAGEN — 2,560,308
SEALING DOOR
Filed Sept. 13, 1945 — 2 Sheets-Sheet 1
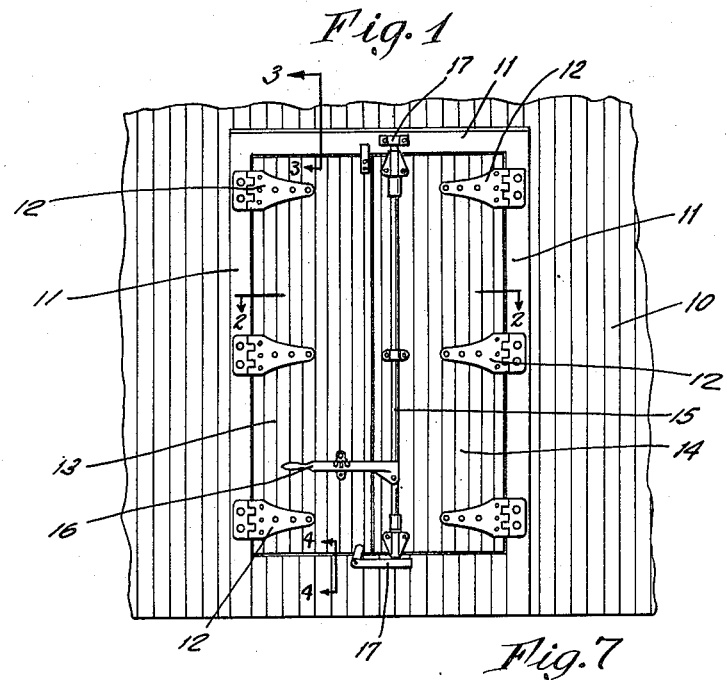
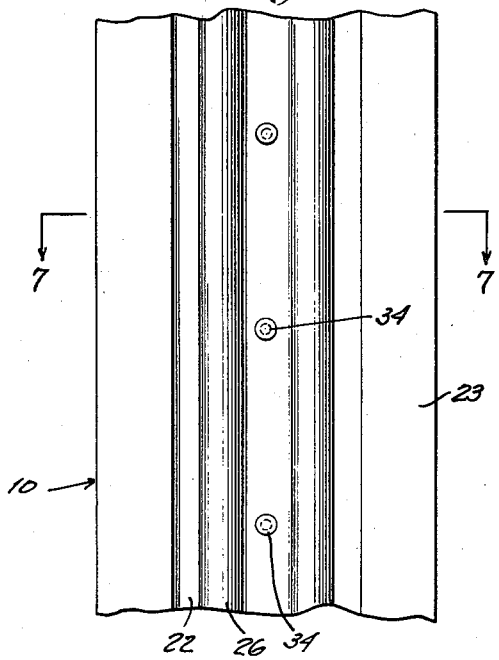
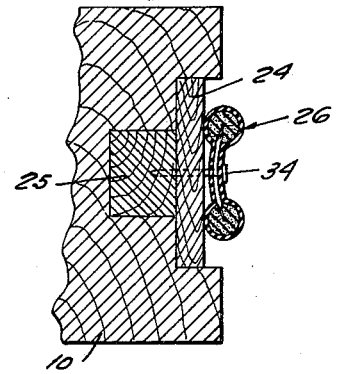
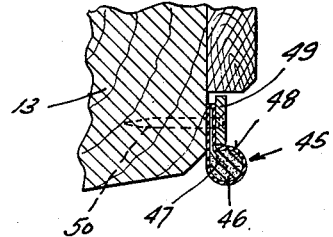
INVENTOR
Louis Spraragen
BY Johnson and Kline
ATTORNEYS

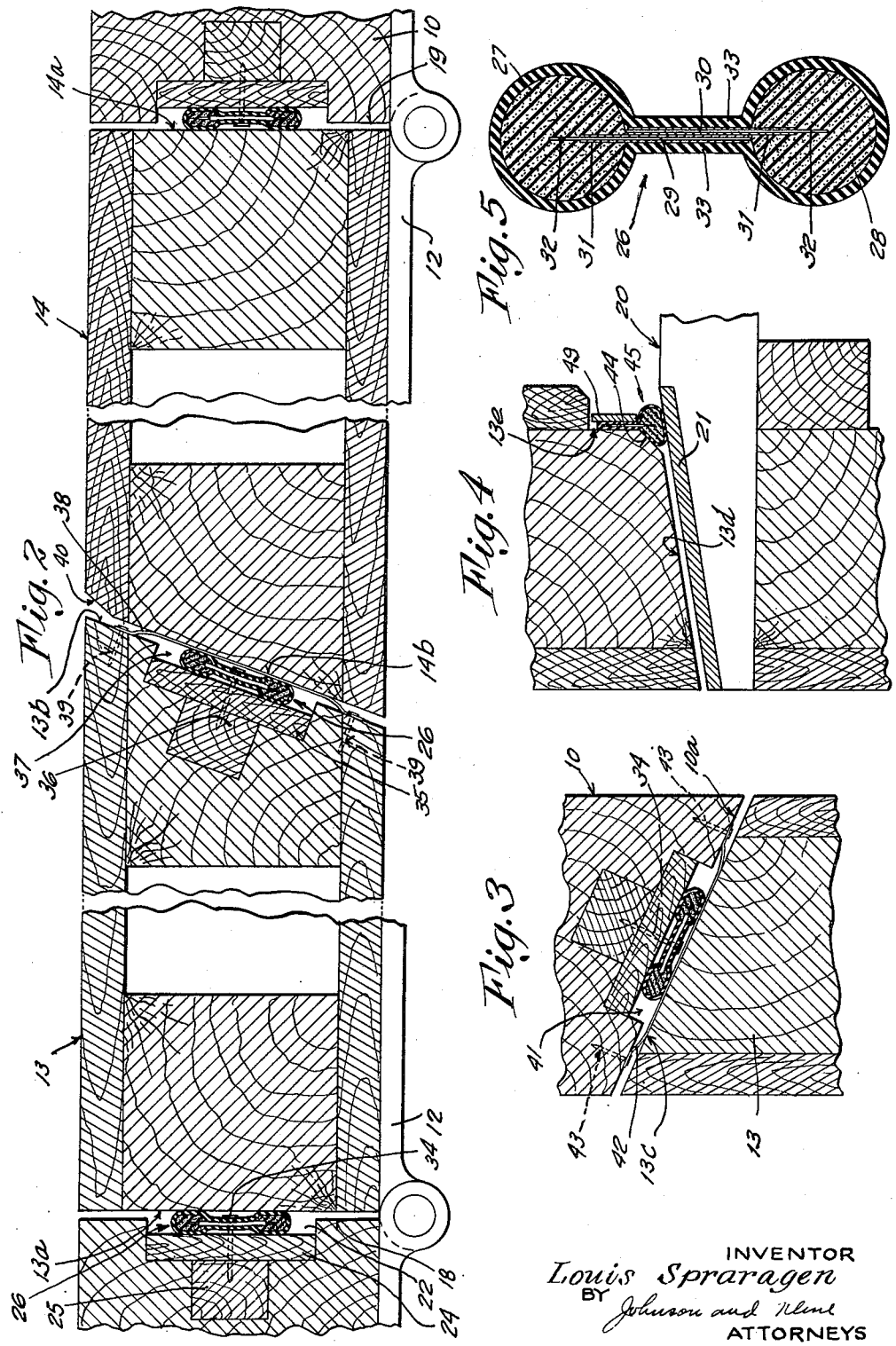

Patented July 10, 1951

2,560,308

UNITED STATES PATENT OFFICE 2,560,308

SEALING DOOR

Louis Spraragen, Bridgeport, Conn., assignor to Bridgeport Fabrics, Inc., Bridgeport, Conn., a corporation of Connecticut Application September 13, 1945, Serial No. 616,017

7 Claims. (Cl. 20—69)

This invention relates to sealed closures such as doors, windows and the like, wherein sealing strips are utilized.

In providing sealing structures such as doors and windows which depend on the filling-in or sealing off of clearance spaces between the movable parts and the supporting walls, difficulty has been encountered in producing cooperable surfaces and sealing elements which would provide a durable construction that would effectively seal at all times despite long hard usage. This has been especially true in applications where heavy freight is handled, as for instance in connection with refrigerator and other freight cars. Sealing elements previously employed in such cars have involved the use of coil compression springs and substantially rigid pressure strips, and breakage of the springs together with abrasion and breakage of the rigid strips has resulted in failure of the parts to properly seal the closures. The constant and severe vibration to which the closures of such cars are subjected during transit are important factors, in addition to the rough handling which the closures receive in operation, in contributing to the failure of these prior constructions, in not standing up under extended use.

According to the present invention this drawback which is characteristic of prior sealing structure has been overcome by providing a novel combination of closure and sealing structure which is extremely rugged and durable, and is able to withstand repeated severe usage while continuing to effectually seal the closure to the supporting wall structure.

Interposed between the mating or abutting surfaces of the closure and wall are sealing elements in the form of strips having a unique construction which is at the same time both rugged and durable, and economical to manufacture.

In one illustrated form of sealing strip a pair of resilient compressible parallel beads is provided, connected together by a flexible web which spans the space between the beads and is preferably embedded in the latter, the entire assemblage being completely covered and enclosed by a thick, tough, resilient cover of dense material such as rubber. The flexible web is so arranged as to serve as a fastening means for receiving nails, screws and the like by which the sealing strip may be quickly and conveniently mounted on the desired surfaces, and the entire structure is extremely rugged and durable, and able to withstand severe usage while at the same time serving to securely seal against the surfaces which it engages.

Due to the strip having a pair of beads, a double sealing effect is provided; also the generally flat character of the strip is such that it may be conveniently mounted within a broad shallow groove, if desired, and covered with a strip of heavy tough canvas tacked along both sides of the groove. With this combination advantage is had of the resiliency and compressibility of the beaded sealing strip, and the added protection afforded by the canvas, and should the latter after a period of usage become worn, it may be easily replaced without disturbing the beaded sealing strip, or requiring replacement of any compressible elements.

In another illustrated form of sealing strip a single resilient compressible bead of substantially cylindrical shape is provided, having a thin flexible attaching strip embedded and anchored therein, the attaching strip being formed to have a concavo-convex section so that, while extending to the center of the bead, it may emerge from the bead surface along a tangential plane to enable it to lie flat against a supporting surface. This assemblage is then enclosed in a thick, tough, continuous cover of dense flexible rubber. As a result of the tangential relation of the strip to the compressible bead, it is possible to utilize a comparatively stiff metal cover strip over the attaching strip when making an installation, the metal strip acting as a clamp and distributing the fastening pressures without tending to unduly stretch or tear the bead or attaching strip.

Other features and advantages will hereinafter appear.

In the accompanying drawings:

Figure 1 shows in elevation to reduced scale a closure and supporting wall structure made in accordance with the invention.

Fig. 2 is a horizontal fragmentary section, to a larger scale, taken on the line 2—2 of Fig. 1.

Fig. 3 is a vertical fragmentary section taken on the line 3—3 of Fig. 1.

Fig. 4 is a vertical fragmentary section, taken on the line 4—4 of Fig. 1.

Fig. 5 is a transverse section through a double-bead type sealing strip made according to the invention.

Fig. 6 is a fragmentary elevation of a double-bead type strip secured to a supporting edge surface, there being no sealing pressure applied.

Fig. 7 is a fragmentary section taken on the line 7—7 of Fig. 6, and

Fig. 8 is a fragmentary section of a single-bead type sealing strip secured adjacent the edge surface of a closure, as provided by the invention.

Referring to Fig. 1, a wooden door and wall structure made according to the invention, suitable for use in connection with refrigerated railroad cars is shown, said structure comprising a side wall 10 having a doorway bounded by molding 11 to which are secured hinges 12 carrying swinging doors 13 and 14.

The doors 13 and 14 may be latched closed in any suitable manner, as by means of a sliding bolt or bar 15 operated by a handle 16, and engaging catches or brackets 17.

According to the invention the cooperable edge surfaces of the doors 13 and 14 and the wall 10 are especially shaped and have novel sealing elements associated therewith so as to produce an efficient and effective seal between the clearance surfaces, and one that will withstand considerable severe and extended usage.

As shown in Fig. 2 the doors 13 and 14 have perpendicular or squared edge surfaces 13a and 14a adjacent the hinges 12, said surfaces being disposed opposite cooperable edge surfaces 18 and 19 respectively of the wall 10 when the doors are in closed position. Along their adjacent or meeting edges, the doors 13 and 14 have cooperable angular edge surfaces 13b and 14b arranged as indicated so that the right-hand door 14 closes last and locks closed the left-hand door 13.

Along their top edges the doors 13 and 14 have angularly disposed edge surfaces also, the surface 13c of the door 13 being shown in Fig. 3, extending along a cooperating sloping edge surface 10a of the wall 10. The bottom edge surfaces of the doors 13 and 14 are also angular or inclined, sloping oppositely to the top edge surfaces, as indicated by the surface 13d of the door 13, see Fig. 4. In this figure the floor of the refrigerator car, indicated at 20, is provided with a sloping threshold 21 located in cooperable relation with the edge surface 13d.

Considering the cooperable surfaces 13a and 18 between the door 13 and wall 10 as shown in Fig. 2, the latter surface is provided with a central broad shallow groove 22 running its entire length. If the vertical frame member 23 of the wall has not been previously cut out to accommodate prior spring-urged types of sealing mediums, the shallow groove 22 may be cut directly into the edge surface 18, but if the member 23 has been previously deeply grooved and recessed at intervals, a filler strip 24 may be employed to partially fill the deep groove, and cylindrical plugs 25 used in the recesses previously occupied by the obsoleted compression coil springs.

Secured to the frame member 23 within the shallow groove 22 thereof is a novel double-bead type sealing strip 26 of economical, extremely rugged and durable construction. Shown in detail in Fig. 5, the sealing strip 26 comprises a pair of beads 27 and 28 which are preferably of circular cross-section and therefore cylindrical shape. The beads 27 and 28 are resilient and compressible, and may be advantageously formed of sponge rubber, which material is highly resilient and of compressible structure, and also resistant to fatigue, aging and adverse action by other substances and by climatic conditions, including atmospheric temperatures.

The beads 27 and 28 have thin, flat flexible webs or attaching strips 29 and 30 respectively, embedded and anchored therein. The strips 29 and 30 may have any of various suitable structures, although preferably they are formed of tape having interwoven fibrous warp strands 31 and metallic wire weft strands 32, and described in my Patent Number 2,299,955, issued October 27, 1942. Also preferably the wire weft strands along one edge of each tape extend or project substantially beyond the outermost fibrous warp strand at that edge, as shown in Fig. 5, the wire projections of the webs or strips 29 and 30 occupying substantially the central portions of the beads 27 and 28. The webs or strips 29 and 30 may be embedded in the sponge rubber beads 27 and 28 by an extrusion process as described in my above-referred-to patent.

After the beads 27, 28 and respective attached strips 29, 30 have been manufactured as individual assemblies, according to the present invention the exposed portions of the strips are overlapped as shown in Fig. 5 preferably sufficiently to enable the outer edge of each strip to abut the bead of the other strip.

The overlapped strips are then secured together, as by stitches or staples or other suitable means, and the complete assemblage passed through an extruding means wherein a thick, tough, resilient cover 33 of dense rubber or equivalent material is applied in such a manner as to completely envelop the assemblage and take the general shape thereof.

By this construction a double-bead type sealing strip is produced which is extremely sturdy and resistant to rough and severe usage. Due to the compressible structure of the sponge rubber beads 27 and 28, the sealing strip 26 when in use may be readily squeezed or deformed, as shown in Fig. 2, by confinement between two approaching surfaces.

The sealing strip 26 may be quickly and conveniently secured to supporting surfaces by the use of headed fasteners 34 such as nails, screws and the like, Fig. 2, which may be passed through the overlapped strips 29 and 30, and into the strip 24 underneath.

The depth of the groove 22, and the diameters of the covered beads 27, 28 are so proportioned that, when the sealing strip 26 is in place and the door 13 is moved to closed position the edge surface 13a thereof will engage and compress and deform the beads of the sealing strip so that a substantial pressure is exerted by the strip on the surface 13a and on the filler strip 24. As a result, an effective seal is provided along the edge of the door 13 to which the hinges 12 are attached.

In a similar manner the edge surface 14a of the door 14 is sealed against a filler strip 24 secured in the edge of the wall 10.

The sealing strip 26 is also used to seal the adjacent sloping edge surfaces 13b and 14b of the doors 13 and 14, as shown in Fig. 2. If the edge surface 13b has previously been deeply grooved to carry a prior type of spring-urged sealing means, a filler strip 35 may be provided to fit along the bottom of the groove as already previously described, and plugs 36 may be used to fill in recesses which were previously occupied by the coil springs. The sealing strip 26 may then be secured within the shallow groove 37 in the edge surface 13b by suitable fasteners such as nails as shown.

Preferably, according to this invention, the sealing strip 26 secured in the groove 37 is covered by a strip of heavy wear-resistant canvas 38, the edges of which may be secured to the surface 13b at regular intervals by rows of nails 39 extending along the edges of the groove 37.

When the door 13 is closed and then the door 14 closed, the surface 14b thereof will engage the canvas strip 38 and press the latter in, against the sealing strip 26, compressing and distorting the beads thereof as shown. The strip 26 will thereby be caused to exert continuous pressure on the canvas strip 38 at all points along its length, thereby providing an effective seal between the canvas strip and the sloping surface 14b.

If desired, the surface 14b may be cut away as shown at 40, Fig. 2, to provide a beveled edge and thereby reduce the likelihood of said edge causing abrasion of the canvas strip 38.

Referring to Fig. 7, the shape taken by the sealing strip 26 when not under sealing pressure is illustrated. As shown, it is not necessary to drive the nails or screws which pass through the center of the sealing strip all the way in, although this may be done if desired. However, if the nails are driven in just sufficiently to securely hold the strip in place but not so far as to cause the heads of the nails to become deeply embedded in the cover 33 of the strip, the life of the strip will be greatly prolonged, since there is reduced the likelihood of piercing the cover and otherwise destroying the structure of the strip.

Along the top edges of the doors 13 and 14 the sealing strip 26 may be advantageously used as shown in Fig. 3. The sealing strip is preferably secured to the sloping edge surface 10a of the wall 10 to occupy a shallow groove 41 thereof, and a cover strip 42 of heavy canvas may be secured to the surface 10a by nails 43 in the manner already described.

When the door 13 is swung closed, the sloping top edge 13c of the door will engage the canvas strip 42 and force the latter in against the sealing strip 26, compressing the beads thereof so that a continuous pressure is maintained between the canvas and the surface 13c, providing an effectual seal.

According to this invention a novel sealing structure is provided at the threshold of the doorway in the wall 10, along the bottom edge surfaces of the doors 13 and 14. Referring to Figs. 4 and 8 the bottom edge surface 13d of the door 13 is cut away at 44 to provide a beveled surface which cooperates with the threshold plate 21 to produce a wedging sealing action. The rear surface 13e of the door 13 adjacent the bevel 44 is provided with a single-bead type of sealing strip 45 as shown in Fig. 8. This sealing strip comprises a sponge rubber bead 46 having embedded therein a thin attaching strip or web 47 which is bent along a longitudinal line so that where it emerges from the bead 46 its surface is substantially tangential to that of the bead. In other words, the shape of the attaching strip 47 is such that one side is substantially hollow or concave, and the other side bulging or substantially convex.

The bead 46 and embedded attaching strip 47 are passed through an extruding means wherein a thick, tough, resilient cover 48 of dense rubber is applied, which completely encompasses and seals the bead and attaching strip.

In securing the strip 45 to the surface 13e, a flat metal strip 49 is preferably employed, overlying the covered attaching strip 47. The metal strip 49 is apertured and countersunk to receive flathead screw 50 which also pass through the attaching strip 47 and into the door 13.

Referring to Fig. 8, the sealing strip 45 is secured in place in such a manner that the bead 46 thereof is adjacent the bevel 44 of the door but spaced from the latter, and projects below the plane of the edge surface 13d. Thus, when the door 13 is closed the bead of the strip 45 will engage the threshold plate 21 slightly before the door has completed its closing movement. Further movement of the door to the fully closed position shown in Fig. 4 will cause the bead 46 of the sealing strip to be tightly wedged between the threshold 21 and the beveled surface 44, thereby providing a tight seal along the bottom edge of the door 13.

The bottom edge of the door 14 is similarly provided with a sealing strip 45 in the manner just described so that a tight seal is effected along the entire threshold 21 of the doorway.

Variations and modifications may be made within the scope of this invention and portions of the improvements may be used without others.

I claim:

1. A sealing strip comprising a pair of substantially parallel beads of resilient material; a pair of substantially flat thin flexible webs, each having an edge portion embedded and anchored in a different bead, exposed areas of said webs overlapping thereby to span the space between the beads; and a thick continuous cover of tough, resilient material enclosing the said beads and webs.

2. A sealing strip comprising a pair of substantially parallel beads of resilient material; a pair of substantially flat thin flexible webs, each having an edge portion embedded and anchored in a different bead, exposed areas of said webs overlapping thereby to span the space between the beads; means for securing the webs together in overlapped relation; and a thick continuous cover of tough resilient material closing the said beads and webs.

3. A sealing strip comprising a pair of substantially parallel beads of sponge rubber; a pair of substantially flat, thin flexible woven webs, each having an edge portion embedded and anchored in a different bead, the exposed areas of said webs overlapping thereby to span the space between the beads; stitches securing together the overlapped webs; and a thick continuous cover to dense tough rubber enclosing the said beads and webs in their entirety.

4. A sealing strip comprising a pair of substantially parallel beads of sponge rubber; a pair of substantially flat thin flexible woven webs, each comprising fibrous warp strands and metallic wire weft strands, the latter along one edge of each web projecting substantially beyond the outermost warp strand, said projecting weft strands of each web being embedded and anchored in a different bead, and the exposed areas of the webs completely overlapping each other, and abutting the said beads, thereby to span the space between the beads with a double web thickness; stitches securing together the webs in overlapped relation; and a thick, continuous cover of dense, tough rubber enclosing the said beads and webs in their entirety, and conforming to the shapes thereof.

5. In a sealing means for closures, the combination of a closure member having an edge face; of a member having an edge face in opposed relation to the edge face of the closure member, the face of one of the members having a shallow longitudinal groove therein; and a sealing member mounted in the groove and having a resilient bead in engagement with the bottom of the groove, said groove having a depth less than the thickness of the bead whereby the bead projects beyond the face to be engaged by the opposed face of the other member, said bead being compressed between said last-named face and bottom of the groove to form a seal between the two members.

6. In a sealing means for closures, the combination of a closure member having an edge face; of a member having an edge face in opposed relation to the edge face of the closure member, the face of one member having a shallow longitudinal groove therein; and a sealing member mounted in the groove to extend longitudinally therealong, said member comprising a pair of substantially parallel beads of resilient compressible material, a substantially flat, thin, flexible web disposed broadside to the bottom of the groove and extending between and connecting together the beads, the opposite edge portions of the web being embedded and anchored in the heads, and a thick, continuous, abrasion-resistant cover of dense, tough, resilient material enclosing the said beads and web in their entirety, said beads being in engagement with the bottom of the groove, said groove having a depth less than the thickness of the beads whereby the bead projects beyond the face to be engaged by the opposed face of the other member, said bead being compressed between said face and bottom of the groove to form a seal between the two members.

7. In a sealing means for closure members having opposed edge faces, at least one of which has a shallow longitudinal groove therein, a sealing member mounted in the groove and having a resilient bead in engagement with the bottom of the groove, said groove having a depth less than the thickness of the bead whereby the bead projects beyond the said edge face to be engaged by the opposed edge face, said bead being compressed between said face and bottom of the groove to form a seal between the two members.

LOUIS SPRARAGEN.

REFERENCES CITED

The following references are of record in the file of this patent:

UNITED STATES PATENTS

| Number | Name | Date |
| --- | --- | --- |
| 562,001 | La Flare | June 16, 1896 |
| 1,625,764 | Bosley | Apr. 19, 1927 |
| 2,299,955 | Spraragen | Oct. 27, 1942 |
| 2,347,158 | Spraragen | Apr. 18, 1944 |

FOREIGN PATENTS

| Number | Country | Date |
| --- | --- | --- |
| 405,747 | Great Britain | Feb. 15, 1934 |
| 513,553 | Great Britain | Oct. 16, 1939 |

Certificate of Correction

Patent No. 2,560,308                                              July 10, 1951

LOUIS SPRARAGEN

It is hereby certified that error appears in the printed specification of the above numbered patent requiring correction as follows:

Column 5, line 71, for "screw" read *screws*; column 6, line 46, for "to dense" read *of dense*; column 7, line 17, for "heads" read *beads*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*